US011623416B2

(12) United States Patent
Davidson et al.

(10) Patent No.: US 11,623,416 B2
(45) Date of Patent: Apr. 11, 2023

(54) MULTI-PART MOLDS AND METHODS FOR FORMING COMPLEX FIBER-COMPOSITE PARTS

(71) Applicant: Arris Composites Inc., Berkeley, CA (US)

(72) Inventors: Erick Davidson, Piedmont, CA (US); J. Scott Perkins, Oakland, CA (US); Riley Reese, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 16/906,987

(22) Filed: Jun. 19, 2020

(65) Prior Publication Data

US 2020/0398460 A1 Dec. 24, 2020

Related U.S. Application Data

(60) Provisional application No. 62/863,475, filed on Jun. 19, 2019.

(51) Int. Cl.
*B29C 70/46* (2006.01)
*B29C 43/00* (2006.01)
*B29C 43/36* (2006.01)
*B29C 70/00* (2006.01)
*B29K 105/12* (2006.01)

(52) U.S. Cl.
CPC .......... *B29C 70/462* (2013.01); *B29C 43/003* (2013.01); *B29C 43/36* (2013.01); *B29C 70/0035* (2021.05); *B29C 2043/3602* (2013.01); *B29C 2043/3665* (2013.01); *B29K 2105/12* (2013.01)

(58) Field of Classification Search
CPC ......... B29C 43/36; B29C 43/04; B29C 33/00; B29C 70/00
See application file for complete search history.

(56) References Cited

U.S. PATENT DOCUMENTS

| 1,597,761 A | * | 8/1926 | Burt ........................ B29C 43/38 |
| | | | 425/393 |
| 2,239,248 A | * | 4/1941 | Rieser ..................... B29C 43/50 |
| | | | 425/444 |

(Continued)

FOREIGN PATENT DOCUMENTS

JP 2018-192747 12/2018

OTHER PUBLICATIONS

Authorized Officer D Bibollet-Ruche, International Search Report and Written Opinion dated Sep. 24, 2020 in PCT Patent Application No. PCT/US2020/038799.

*Primary Examiner* — Andrew D Graham
(74) *Attorney, Agent, or Firm* — Kaplan Breyer Schwarz, LLP

(57) ABSTRACT

A multi-part compression mold for forming a complex part having a desired fiber alignment, and methods therefor, are disclosed. The multi-part mold comprises at least three sections. Specific arrangements of fiber-bundle-based preforms are introduced to more than one of the mold sections of the multi-part mold, and subjected to compression molding. The arrangements of preforms, in conjunction with the multi-part mold, result in a complex part having fibers that substantially align with anticipated principle stress vectors that arise in the complex part, when in use.

13 Claims, 9 Drawing Sheets

(56) References Cited

U.S. PATENT DOCUMENTS

| | | | | |
|---|---|---|---|---|
| 3,408,693 A * | 11/1968 | Murakami | B29C 70/28 | 156/501 |
| 3,809,736 A * | 5/1974 | Munk | B27N 5/00 | 264/120 |
| 4,025,686 A * | 5/1977 | Zion | B29C 70/025 | 442/373 |
| 4,028,042 A * | 6/1977 | Goodfellow | B29C 43/04 | 425/515 |
| 4,397,706 A * | 8/1983 | Allen | B29C 31/066 | 156/242 |
| 4,443,173 A * | 4/1984 | Mansberger, II | B29C 45/14032 | 425/110 |
| 4,452,420 A * | 6/1984 | Lundquist | B29C 33/0033 | 249/142 |
| 4,502,659 A * | 3/1985 | Stephenson | B29C 45/4471 | 249/66.1 |
| 4,532,097 A * | 7/1985 | Daniels | B29C 70/081 | 264/258 |
| 4,533,312 A * | 8/1985 | Von Holdt | B29C 45/4421 | 249/142 |
| 4,557,889 A * | 12/1985 | Masuda | B29C 43/04 | 264/320 |
| 4,583,933 A * | 4/1986 | Woelfel | B29C 53/60 | 249/56 |
| 4,643,663 A * | 2/1987 | Bowles | B29C 43/04 | 425/406 |
| 4,804,427 A * | 2/1989 | Paul | D04H 3/12 | 156/181 |
| 4,828,479 A * | 5/1989 | Pleasant | B29C 45/2673 | 425/192 R |
| 4,927,347 A * | 5/1990 | Golata | B29C 33/22 | 249/161 |
| 4,937,032 A | 6/1990 | Krone et al. | | |
| 5,049,175 A * | 9/1991 | Ross | C03B 19/04 | 65/427 |
| 5,198,167 A * | 3/1993 | Ohta | B29C 43/14 | 162/152 |
| 5,204,127 A * | 4/1993 | Prusha | B29C 45/02 | 425/468 |
| 5,227,113 A * | 7/1993 | Hamabe | B29B 11/16 | 264/258 |
| 5,238,387 A * | 8/1993 | Hama | B29C 51/34 | 425/388 |
| 5,262,116 A * | 11/1993 | Von Holdt, Sr. | B29C 45/2673 | 264/297.2 |
| 5,275,765 A * | 1/1994 | Go | B29C 45/14065 | 264/1.25 |
| 5,350,289 A * | 9/1994 | Martin | B29C 31/006 | 264/328.1 |
| 5,435,953 A * | 7/1995 | Osada | B29C 45/02 | 264/102 |
| 5,523,038 A * | 6/1996 | Kunieda | B29C 48/06 | 264/135 |
| 5,558,883 A * | 9/1996 | Shinada | B29C 45/14196 | 264/46.4 |
| 5,585,061 A * | 12/1996 | Hara | B29C 43/183 | 264/259 |
| 5,603,871 A * | 2/1997 | Koseko | B29C 43/183 | 264/1.9 |
| 5,662,946 A * | 9/1997 | Pratt | B29C 45/2673 | 425/190 |
| 5,728,309 A * | 3/1998 | Matsen | B22F 3/105 | 219/633 |
| 5,744,173 A * | 4/1998 | Sterett | B22C 9/00 | 425/144 |
| 6,319,447 B1 * | 11/2001 | Cundiff | B29C 70/48 | 264/257 |
| 7,169,343 B1 * | 1/2007 | Mills | B29C 70/088 | 264/257 |
| 7,785,519 B2 * | 8/2010 | Pacchiana | F16D 65/125 | 264/319 |
| 9,844,902 B2 * | 12/2017 | Holderman | B29C 45/2673 | |
| 9,931,768 B2 * | 4/2018 | Mai | B29C 33/301 | |
| 2003/0037638 A1 | 2/2003 | Dal Pra' | B29C 43/18 | 74/594.1 |
| 2003/0230827 A1 * | 12/2003 | Soh | B29C 43/58 | 264/239 |
| 2005/0173002 A1 * | 8/2005 | Simendinger | F16K 27/067 | 137/375 |
| 2006/0012075 A1 * | 1/2006 | Spengler | B29C 43/36 | 264/320 |
| 2006/0097469 A1 * | 5/2006 | Nosworthy | A63C 17/017 | 280/87.042 |
| 2006/0131788 A1 * | 6/2006 | Takigawa | B29C 45/561 | 264/328.1 |
| 2006/0208379 A1 * | 9/2006 | Khambete | B29C 43/006 | 264/46.8 |
| 2006/0220273 A1 * | 10/2006 | Armstrong | B29C 70/46 | 264/257 |
| 2007/0160822 A1 * | 7/2007 | Bristow | B29C 43/02 | 428/304.4 |
| 2007/0164481 A1 * | 7/2007 | Polk | B29C 51/20 | 264/320 |
| 2007/0182071 A1 * | 8/2007 | Sekido | B29C 33/0066 | 264/511 |
| 2009/0206202 A1 * | 8/2009 | Bolukbasi | B64C 1/062 | 244/121 |
| 2010/0191292 A1 * | 7/2010 | DeMeo | A61L 31/14 | 606/301 |
| 2010/0196637 A1 * | 8/2010 | Lippert | B29C 70/345 | 428/36.1 |
| 2011/0272536 A1 * | 11/2011 | Valembois | B29C 33/485 | 248/200 |
| 2012/0067509 A1 * | 3/2012 | Kurtz | B29C 70/46 | 156/181 |
| 2013/0270730 A1 * | 10/2013 | Kawachi | B29C 43/58 | 264/40.5 |
| 2014/0265016 A1 * | 9/2014 | Nguyen | B29D 35/0081 | 264/255 |
| 2015/0028514 A1 * | 1/2015 | Viard | B29C 70/48 | 264/156 |
| 2015/0115505 A1 * | 4/2015 | Jones | B29C 70/443 | 264/511 |
| 2016/0046085 A1 * | 2/2016 | Collart | B29C 70/345 | 264/155 |
| 2016/0121562 A1 * | 5/2016 | Werner | B29C 33/306 | 425/520 |
| 2016/0145747 A1 * | 5/2016 | Watson | C25D 1/003 | 205/93 |
| 2016/0297114 A1 * | 10/2016 | Kitayama | B29C 43/021 | |
| 2017/0176129 A1 * | 6/2017 | Haas | B25G 1/01 | |
| 2017/0225767 A1 * | 8/2017 | King | B29C 35/045 | |
| 2018/0056554 A1 * | 3/2018 | Gaw | B29D 99/0089 | |
| 2018/0215083 A1 * | 8/2018 | Halford | B29C 35/16 | |
| 2019/0084214 A1 * | 3/2019 | Drexler | B29C 63/0065 | |
| 2019/0366598 A1 * | 12/2019 | Turmeau | B29C 43/04 | |
| 2019/0366599 A1 * | 12/2019 | LeBlanc | B22F 7/08 | |
| 2020/0016846 A1 * | 1/2020 | Davidson | B29C 70/46 | |
| 2020/0022819 A1 * | 1/2020 | Hurley | B29C 70/088 | |
| 2020/0108568 A1 * | 4/2020 | Davidson | B29C 45/02 | |
| 2020/0114545 A1 * | 4/2020 | Reese | B29B 17/0042 | |
| 2020/0114591 A1 * | 4/2020 | Reese | B29C 70/20 | |
| 2020/0114596 A1 * | 4/2020 | Davidson | B29C 70/46 | |
| 2020/0130297 A1 | 4/2020 | Escowitz et al. | | |

* cited by examiner

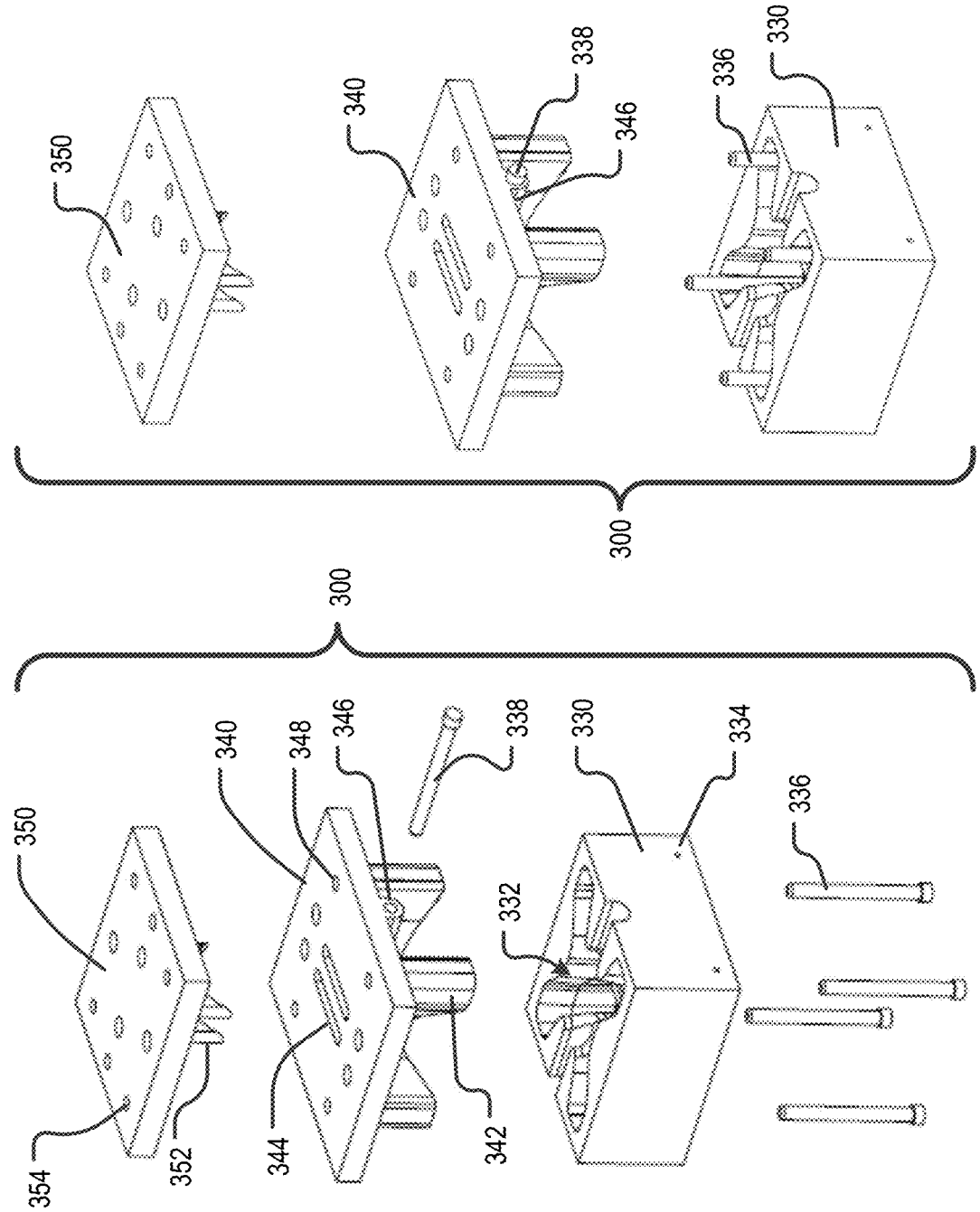

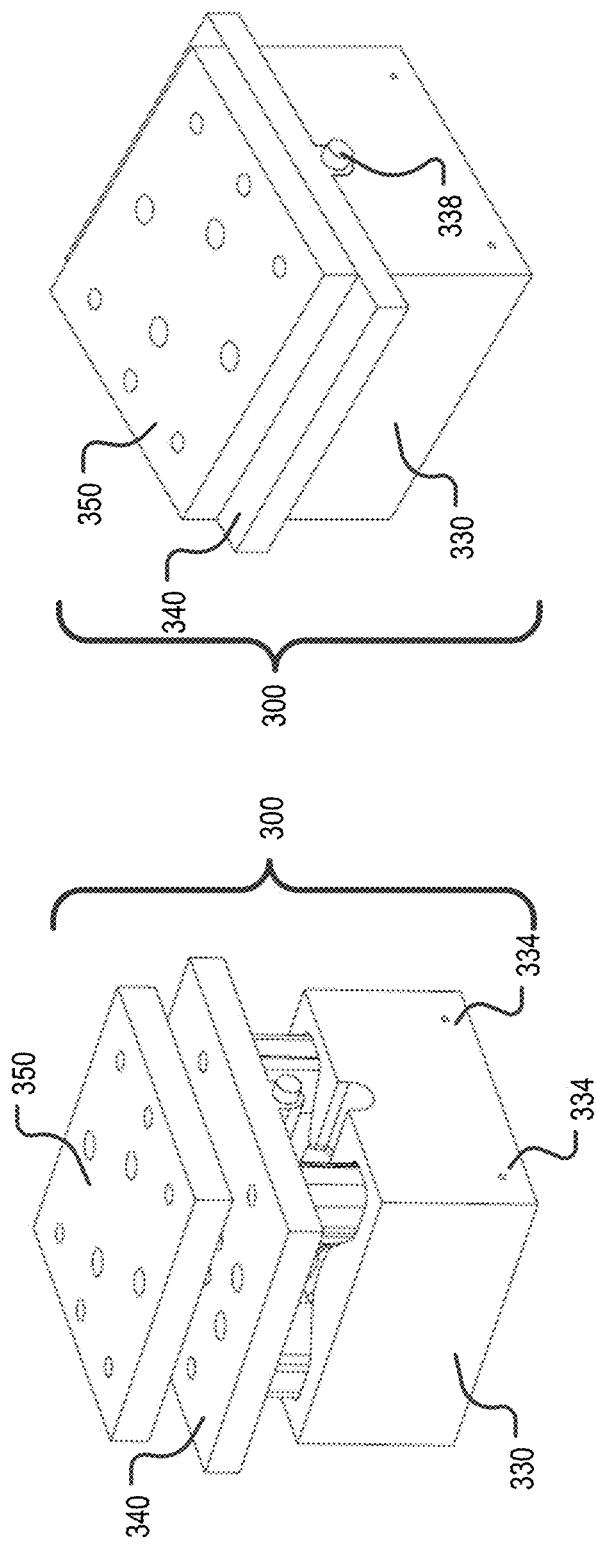

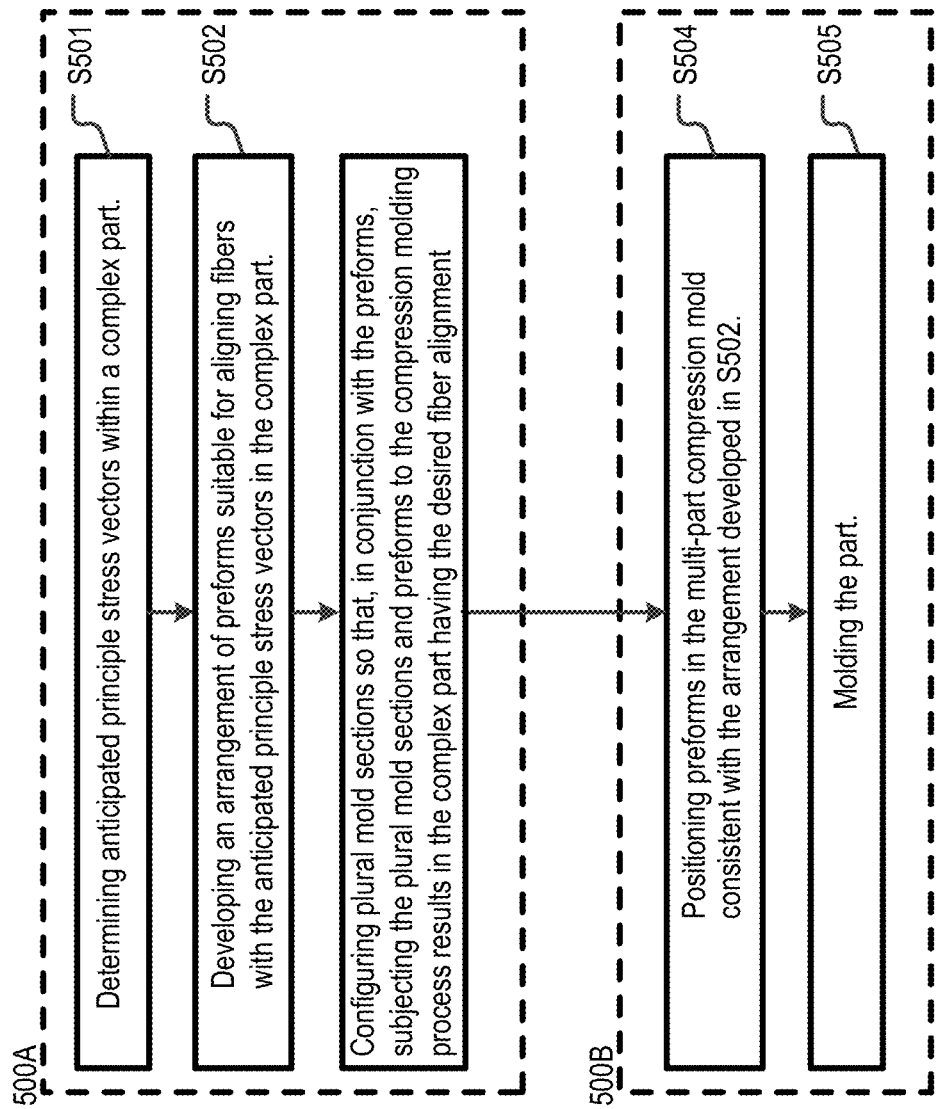

MULTI-PART MOLDS AND METHODS FOR FORMING COMPLEX FIBER-COMPOSITE PARTS

FIELD OF THE INVENTION

The present invention relates to additive molding of fiber-composite materials.

BACKGROUND

Fiber composites are orthotropic materials; that is, they have different material properties in three orthogonal directions. The material properties of strength and modulus of a fiber composite are typically at least an order of magnitude greater in the direction that aligns with the long axis of the fiber than in the other two orthogonal directions. Consequently, aligning the long axis of fibers with the direction(s) of principal stress results in the highest performance parts.

Traditional compression-molding techniques for composite materials use sheet preforms to produce parts. Since the alignment of fibers within a sheet is fixed, there is no ability to orient fibers in desired directions (i.e., along principal stress vectors), apart from simply orienting the sheet in a particular direction. Often, a laminate consisting of multiple sheets, with the fibers from the respective sheets offset in different directions (e.g., a first sheet with fibers at −45°, a second sheet at 0° degrees, a third sheet at +45°, etc.), is used to provide enhanced strength in a few directions. Alternatively, chopped fibers can be used to produce parts via compression molding, often for parts having structural complexity. These short, chopped fibers are discontinuous and adopt a random orientation in the part, resulting in a part exhibiting relatively low strength and stiffness.

SUMMARY

The present invention provides a way to create, via compression molding, complex fiber-composite parts exhibiting excellent material properties.

Articles and methods in accordance with the present teachings are particularly useful for fabricating parts having substantial complexity, such as those having at least two groups of holes wherein the holes in one group are off-axis (i.e., out-of-plane) with respect to those in the other group. Existing compression-molding equipment and methods, such as those using standard two-part mating compression molds, cannot produce parts of similar complexity and performance.

In accordance with the present teachings, a multi-part compression mold having n mold sections, wherein n−1 of the mold sections are movable, and wherein n≥3, is used to fabricate complex parts. In conjunction with appropriately configured feed constituents (e.g., resin and fiber, etc.), multi-part molds disclosed herein facilitate a desired fiber alignment in such complex parts. More particularly, such a mold can be used to substantially align fibers along the anticipated principal stress vectors of a complex part.

With respect to the feed constituents, to achieve a desired fiber alignment in a complex part requires, in addition to the use of a multi-part mold, fiber-bundle-based preforms, and/or assemblages thereof ("preform charges,") in accordance with the present teachings. It was only through its novel use and development of fiber-bundle-based preforms for compression molding that applicant realized a potential for fabricating such complex parts via compression-molding processes. This led, in turn, to the idea of using multi-part molds, in conjunction with such preforms/preform charges, to fabricate these complex parts. Simply put, fiber and resin in the form of tape, sheets, or laminates are not suitable (other than for limited use in planar regions of a part) for use with embodiments of the invention.

The term "mold section," as used herein, means a separable, discrete part of a multi-part mold that is directly involved in shaping at least a portion of the part being formed, thus serving as either a female or male mold part. That is, each mold section will have at least one of:
  (i) a cavity (i.e., a "negative" of the shape of at least a portion of the part being molded), and
  (ii) a member that extends into a cavity or is otherwise capable of imparting shape, or creating features, surface contours, etc., to at least a portion of the part being molded.

Thus, a mold section can, but does not necessarily, have both male and female attributes. With respect to the separability aspect of a mold section, a four-part mold, for example, will include four discrete, separate mold sections.

During molding operations, one of the n mold sections will typically be in a fixed position, and the other mold sections will move relative to that fixed position. Hence, n−1 of the n mold sections are considered to be "movable" during the compression-molding process.

In various embodiments, the invention provides:
  A multi-part compression mold having at least three mold sections, wherein at least one of the mold sections comprises a cavity.
  A multi-part compression mold having at least three mold sections, wherein at least one of the mold sections comprises a cavity, and at least one of the mold sections comprises a member that extends into the cavity.
  A multi-part compression mold having at least three mold sections, including a mold base comprising a cavity, a first core comprising an opening, the first core also including a first member that extends into the cavity, and a second core comprising a second member that extends into the opening.
  A multi-part compression mold having at least three mold sections, wherein at least one of the mold sections receives at least one pin for forming a first hole, and at least one of the other mold sections receives at least one pin for forming a second hole, wherein the first hole and the second are off axis with respect to one another.

In some embodiments, a first method in accordance with the illustrative embodiment of the invention comprises the operations of:
  determining the anticipated principle stress vectors that arise within a complex part based on forces to be imparted to the complex part when the part is in use;
  developing an arrangement of fiber-bundle-based preforms that, when placed in a suitable multi-part mold, and as a consequence of conducting a compression molding process, results in the desired fiber alignment wherein fibers from the preforms substantially align with the anticipated principle stress vectors in the complex part; and
  configuring plural mold sections so that, in conjunction with the preforms, subjecting the plural mold sections and preforms to the compression molding process results in the complex part having the desired fiber alignment.

In some embodiments, the invention provides a method for making a complex part based on the preform arrangement and multi-part mold developed via the first method, comprising the operations of:

positioning preforms/preform charge(s) in the multi-part compression mold consistent with the preform arrangement; and molding the part.

In some embodiments, the operation of positioning preforms/preform charges comprises:

placing a first plurality of preforms/preform charge(s) in a mold cavity in a mold base, wherein at least some of the fibers therefrom substantially align with first anticipated principal stress vectors of a part being formed;

placing a second plurality of preforms/preform charge(s) in an opening in a first mold core, wherein at least some of the fibers therefrom substantially align with second anticipated principal stress vectors of the part being formed.

In some embodiments, the operation of molding the part comprises:

positioning the first mold core proximal to the mold base so that a first member of the first mold core extends into the mold cavity;

positioning a second mold core proximal to the first mold core so that a second member of the second mold core extends into the opening in the first mold core;

applying pressure to, and elevating the temperature of, the mold base, the first mold core, and the second mold core; and cooling the mold base, the first mold core, and the second mold core.

In some embodiments, a multi-part compression mold in accordance with the present teachings will include, in addition to any of the features mentioned above, one or more plungers. In this context, a "plunger" is a member that slides, typically through a channel or opening, to advance molding material (e.g., preforms, etc.) into a mold cavity.

Plungers have been used in injection-molding processes, but in modern injection-molding apparatuses, have mostly been replaced by augers. Moreover, the present inventors have disclosed, in other specifications, compression-molding processes that utilize one or more plungers. The mold sections of multi-part molds in accordance with the present teachings do not "move" in the manner of a plunger, and those skilled in the art will understand the distinction therebetween. It will therefore be understood that a plunger, or any member that otherwise functions to advance material into a mold cavity, such as through a channel and with respect to other non-moving parts of a mold, etc., is not a "mold section," as the term is used in this disclosure and the appended claims. Furthermore, it is known to use a "pin" (i.e., a cylindrical segment) to create holes/openings in a part being formed, and such pins are a part of the mold depicted in the illustrative embodiment. A pin or equivalent member for creating an opening in a portion of a mold is not, in and of itself, a "mold section" for the purposes of this disclosure and the appended claims.

BRIEF DESCRIPTION OF THE DRAWINGS

FIG. 3A depicts an exploded view of a multi-part mold for making the bracket, in accordance with an illustrative embodiment of the present invention.

FIG. 3B depicts the multi-part mold of FIG. 3A with hole-forming pins situated in the cavity of the multi-part mold.

FIG. 4C depicts the multi-part mold of FIG. 4B fully assembled.

FIG. 4D depicts the multi-part mold of FIG. 4C fully closed.

FIG. 5 depicts methods in accordance with an illustrative embodiment of the present invention.

DETAILED DESCRIPTION

Figure 1:
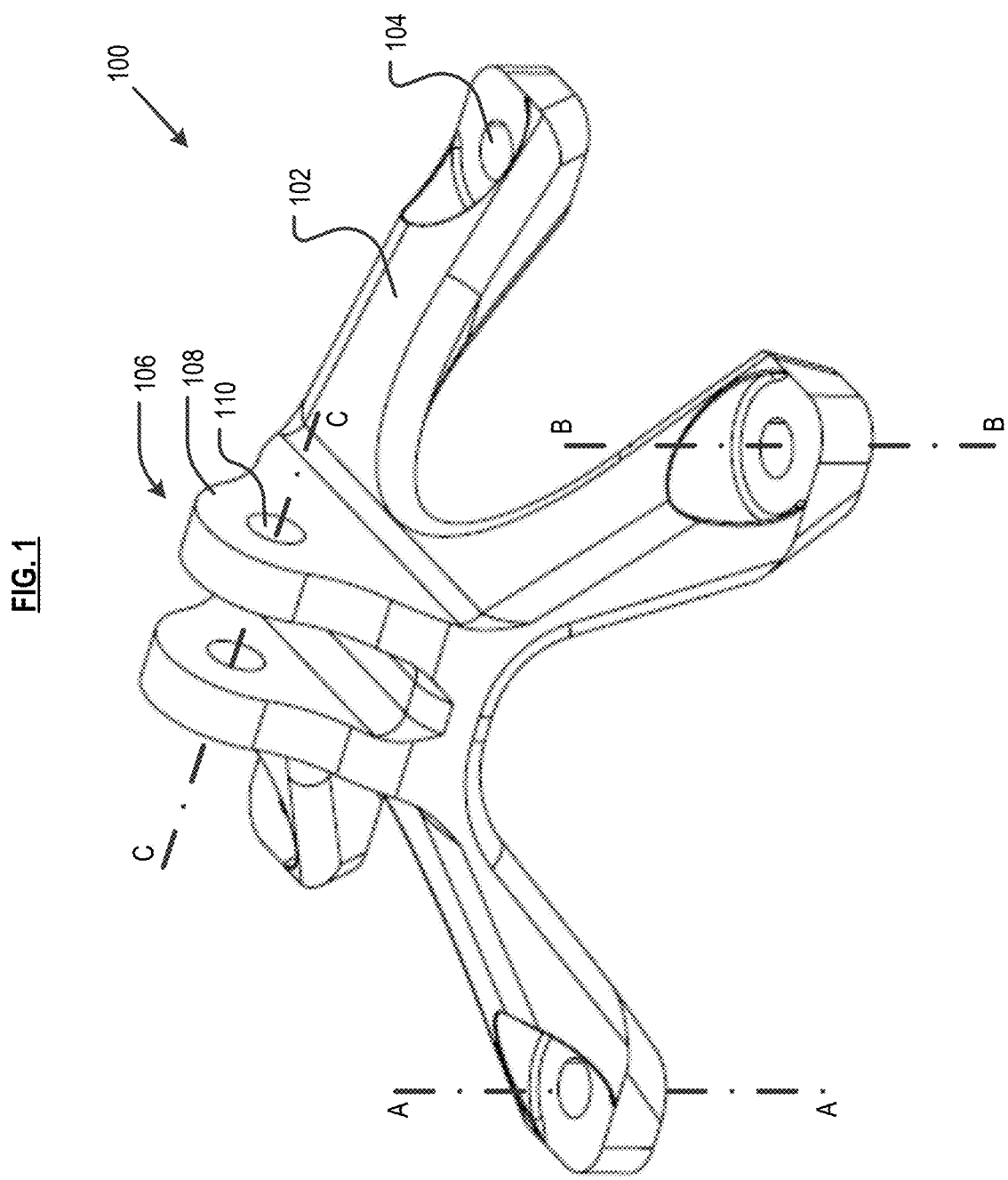
FIG. 1 depicts a perspective view of a bracket.

Definitions. The following terms are defined for use in this description and the appended claims:

"Fiber" means an individual strand of material. A fiber has a length that is much greater than its diameter. For use herein, fibers are classified as (i) continuous or (ii) short. Continuous fibers have a length that is about equal to the length of a major feature of a mold in which they are placed. And, similarly, continuous fibers have a length that is about equal to that of the part in which they will reside. Short fibers have a length that is shorter than the length of a major feature of the mold in which they are placed, and typically comparable to the length of minor features of the mold. The term "short fiber," as used herein, is distinct from the "chopped fiber" or "cut fiber," as those terms are typically used in the art. In the context of the present disclosure, continuous fiber and/or short fiber is present in a preform and, as such, will have a defined orientation in the preform, the mold, and the final part. As used generally in the art, chopped or cut fiber has a random orientation in a mold and the final part. Additionally, as used herein, the length of "short fiber" will be based on the length of the smaller features of a mold (they will be comparable in length). In contrast, the length of chopped or cut fiber typically bears no predefined relationship to the length of any feature of a mold/part.

"Tow" means a bundle of fibers (i.e., fiber bundle), and those terms are used interchangeably herein unless otherwise specified. Tows are typically available with fibers numbering in the thousands: a 1K tow, 4K tow, 8K tow, etc.

"Prepreg" means fibers that are impregnated with resin.

"Towpreg" means a fiber bundle (i.e., a tow) that is impregnated with resin.

"Preform" means a segment of a continuous resin-infused fiber bundle (e.g., towpreg, the output from a pultrusion line, etc.), wherein the segment has a desired length and shape. Substantially all fibers in any given preform will necessarily have the same length, and are unidirectionally aligned. The cross section of the fiber bundle typically has an aspect ratio (width:thickness) of between about 0.25 to about 6. The term "preform" explicitly excludes sized/shaped (i) tape (which typically has an aspect ratio—cross section, as above—of between about 10 to about 30), (ii) sheets of fiber, and (iii) laminates. The modifier "fiber-bundle-based" is often appended, herein, to the word "preform" to emphasize the nature of applicant's preforms and to distinguish them from prior-art preforms, which are typically in the form of segments of tape or a shape cut from sheets of fiber. But regardless of their ultimate shape/configuration, these prior-art preforms do not provide an ability to control fiber alignment in the manner of applicant's fiber-bundle-based preforms.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of (fiber-bundle-based) preforms that are at least loosely bound together ("tacked") so as to maintain their position relative to one another. Preform charges can contain a minor amount of fiber in form factors other than fiber bundles, and can contain various inserts, passive or active. As compared to a final part, in which fibers/resin are fully consolidated, in a preform charge, the preforms are only partially consolidated (lacking sufficient pressure and possibly even sufficient temperature for full consolidation). By way of example, whereas a compression-molding process is typically conducted at about 1000 psi (which will typically be the destination for a preform-charge in accordance with the present teachings), the downward pressure applied to the preforms to create a preform charge in accordance with the present teachings is typically in the range of about 10 psi to about 100 psi. Thus, voids remain in a preform charge, and, as such, the preform charge cannot be used as a finished part.

"About" or "Substantially" means +/−20% with respect to a stated figure or nominal value (e.g., a size, a location, a position, an angular orientation, etc.)

Additional definitions may appear in context throughout this specification.

Unless otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

As mentioned in the Summary section, embodiments of the present invention are directed toward the fabrication of parts having substantial complexity. Such parts, referred to herein as "complex parts," have at least two groups of holes wherein the holes in one group are off-axis (i.e., out-of-plane) with respect to those in the other group. Existing methods, such as those using standard two-part mating compression molds, cannot produce complex parts having continuous fibers substantially aligned with principle stress vectors.

In accordance with the present teachings, a mold having n mold sections is used to fabricate complex parts, wherein n≥3, and wherein n−1 of the mold sections are movable during the molding process. The multi-part compression molds disclosed herein facilitate a desired fiber alignment in complex parts. That is, these molds can be used to substantially align fibers along the anticipated principal stress vectors that arise in a complex part when in use. However, to achieve this promise requires that the feed constituents are in the form of fiber-bundle-based preforms, or assemblages thereof (preform charges).

The illustrative embodiment of the invention is a three-part mold that is capable, during a compression molding process, of positioning continuous fibers along anticipated (i.e., in use) principal stress vectors of a part being manufactured. In the illustrative embodiment, the three-part mold is configured to make bracket 100, depicted in FIG. 1. As discussed further below and in accordance with the definition, a measure of the complexity of bracket 100, at least from a manufacturing perspective, is its two groups of holes, wherein the holes in one of the groups are off-axis with respect to the holes in the other group.

Bracket 100 includes four prongs 102, each having hole 104 disposed at a free-end thereof. Bracket 100 further includes clevis 106, which is centrally disposed with respect to the four prongs 102. The clevis includes two tabs 108, each of which has hole 110 therethrough. The holes 110 in tabs 108 are coaxial, each aligned with axis C-C.

Hole 104 in each prong 102 aligns with an axis, such as axis A-A, B-B, etc., that is parallel to the axis of all other holes 104. As depicted, the axis of each of holes 104 is orthogonal to axis C-C of holes 110 in tabs 108. It is therefore apparent that, within a given group of holes (i.e., holes 104 in prongs 102 or holes 110 in tabs 108), the axes of the holes are parallel (or co-linear) with respect to each other. However, as between the different groups of holes, the axes are not parallel/co-linear with respect to each other. In particular, in exemplary bracket 100, the axes of the two groups of holes are oriented orthogonally with respect to one another. As indicated above, that results in substantial manufacturing complexity.

Bracket 100 can be used for any number of purposes, such as to actuate a control surface. For such an application, holes 104 are used to connect bracket 100 to the control surface, and an actuator will often attach to a clevis pin that runs through (clevis pin) holes 110.

In use of bracket 100, the maximum stress is located where tabs 108 meet prongs 102. Furthermore, when in use, (clevis) holes 110 receive a clevis pin (not depicted), and (mounting) holes 104 receive mounting bolts (not depicted). The regions surrounding these holes, which must support the bearing loads imparted by the pin and bolts, are also principal stress paths.

If bracket 100, as a fiber-composite part, is expected to exhibit best-attainable mechanical properties, such as high tensile strength and high bending stiffness (as measured by displacement of clevis pin relative to mounting holes), then an ideal fiber alignment strategy, in which fibers perfectly align with the principal stress vectors, is required. Although an "ideal" fiber alignment may not be attainable, embodiments of the invention are capable of creating highly desirable fiber alignments, wherein fibers are substantially aligned with the principal stress vectors.

To reliably create such highly desirable, and typically non-linear fiber alignments, the applicant uses fiber-bundle-based preforms and preform charges, as defined herein. Although flat tape, sheets, and laminates, as are used for other molding applications in the prior art, might be suitable for use in certain portions of a complex part (e.g., a relatively large, flat region, etc.), any such use as a feed constituent with the multi-part compression molds for forming complex parts, as disclosed herein, is exceedingly limited.

Each preform, like the spool of prepreg or the pultrusion-line output from which it is sourced, include thousands of unidirectionally aligned, resin-infused fibers, typically in multiples of one thousand (e.g., 1k, 10k, 24k, etc.). A preform may have any suitable cross-sectional shape (e.g., circular, oval, trilobal, polygonal, etc.).

The individual fibers in the fiber-bundle-based preform will typically have a diameter in a range of about 1 to about 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), alumina silicate, calcium silicate, rock wool, boron nitride, silicon carbide, and combinations of any of the foregoing. Furthermore, carbon nanotubes can be used.

Any resin—thermoplastic or thermoset—that bonds to itself under heat and/or pressure can be used in the fiber bundles. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). An exemplary thermoset is epoxy.

For a variety of reasons, in some embodiments, rather than adding individual preforms to the multi-part molds disclosed herein, one or more assemblages of such preforms—referred to herein as a "preform charge"— is placed in the mold. The preform charge, which is typically three-dimensional arrangement of preforms, is usually created in a fixture separate from the mold, and which is dedicated and specifically designed for that purpose. To create a preform charge, preforms are placed (either automatically or by hand) in a preform-charge fixture. By virtue of the configuration of the fixture, the preforms are organized into a specific geometry and then tacked together. The preform charge is not fully consolidated, but once the preforms are joined, they will not move, thereby maintaining the desired geometry and the specific alignment of each preform in the assemblage. The shape of the preform charge usually mirrors that of the intended part, or a portion of it, and, hence, the mold cavity (or at least a portion thereof) that forms the part. See, e.g., Publ. Pat. App. US2020/0114596 and U.S. patent application Ser. No. 16/877,236, incorporated herein by reference.

Moreover, and most importantly in the present context, the preforms in the preform charge are arranged to provide a desired fiber alignment. In other words, when the preform charge is placed in the complex multi-part molds disclosed herein, a portion of the fibers are situated so that their position in the final part will align with one or more principle stress vectors that are expected to arise in the part, when in use.

In some embodiments, each preform, whether present as individual preforms in a layup or tacked together in a preform charge, will have the same composition as all other preforms (i.e., the same fiber type, fiber fraction, and resin type). However, in some other embodiments, some of the preforms can differ from one another. For example, there may be instances in which different properties are desired at different regions within a complex part.

It is preferable, but not necessary, for all preforms to include the same resin. But to the extent different resins are used in different preforms, they must be "compatible," which means that they will bond to one another. A preform charge can also include inserts that are not fiber based. Unless otherwise indicated, the terms "preforms" or "fiber-bundle-based preforms" as used hereinafter in this disclosure and the appended claims, means "preforms and/or preform charge(s)."

As should be clear from the foregoing, substantially all fibers present in a complex part formed in accordance with the invention are sourced from fiber-bundle-based preforms. Of course, as the preforms are fully consolidated under temperature and pressure during compression molding, their initial well-defined geometric structure is not preserved. Thus, to the extent that the disclosure (either written or depicted in drawings) references the position of preforms in a part, such disclosure will be understood to reference the positions of fibers sourced from such preforms.

As previously noted, an "ideal" fiber alignment may not be attainable, but embodiments of the invention, through the use of the novel multi-part molds and preform-sourced fibers, are capable of creating highly desirable fiber alignments, wherein fibers are substantially aligned with anticipated principal stress vectors. Such a highly desirable fiber alignment for bracket 100 is discussed below in conjunction with FIG. 2A.

Figure 2A:
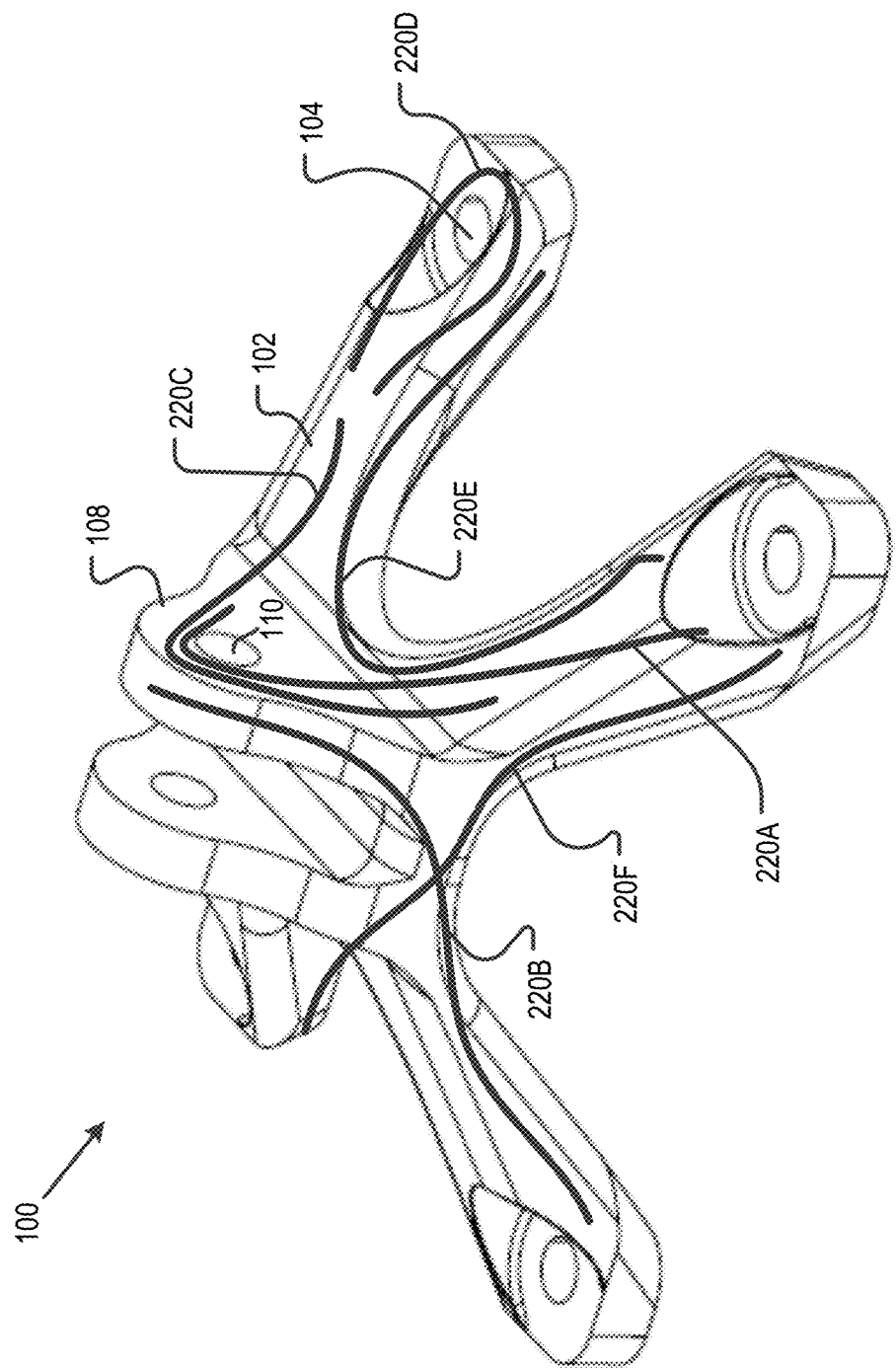
FIG. 2A depicts a desired fiber-alignment strategy for selected regions of the bracket of FIG. 1.

Referring now to FIG. 2A, and as previously mentioned, the maximum stress arising in bracket 100, in use, is located where tabs 108 meet prongs 102. Consequently, it is important to have fibers, such as from preform 220A, extend from tabs 108 well into prongs 102. It is notable that preform 220A extends to an adjacent prong 102. For improved load distribution, fibers, such as those of preform 220B, should extend from tab 108 to a prong 102 that is distal to the tab.

The regions surrounding holes 110 and 104 represent additional principal stress paths. As such, fibers, such as sourced from preforms 220C and 220D, should at least partially encircle respective holes 110 and 104. Additionally, for satisfactory stiffness, it is advantageous to have fibers extending between adjacent prongs 104, as accomplished by preform 220E, and to have fibers extending between diagonally disposed prongs 104, as accomplished by preform 220F.

Figure 2B:
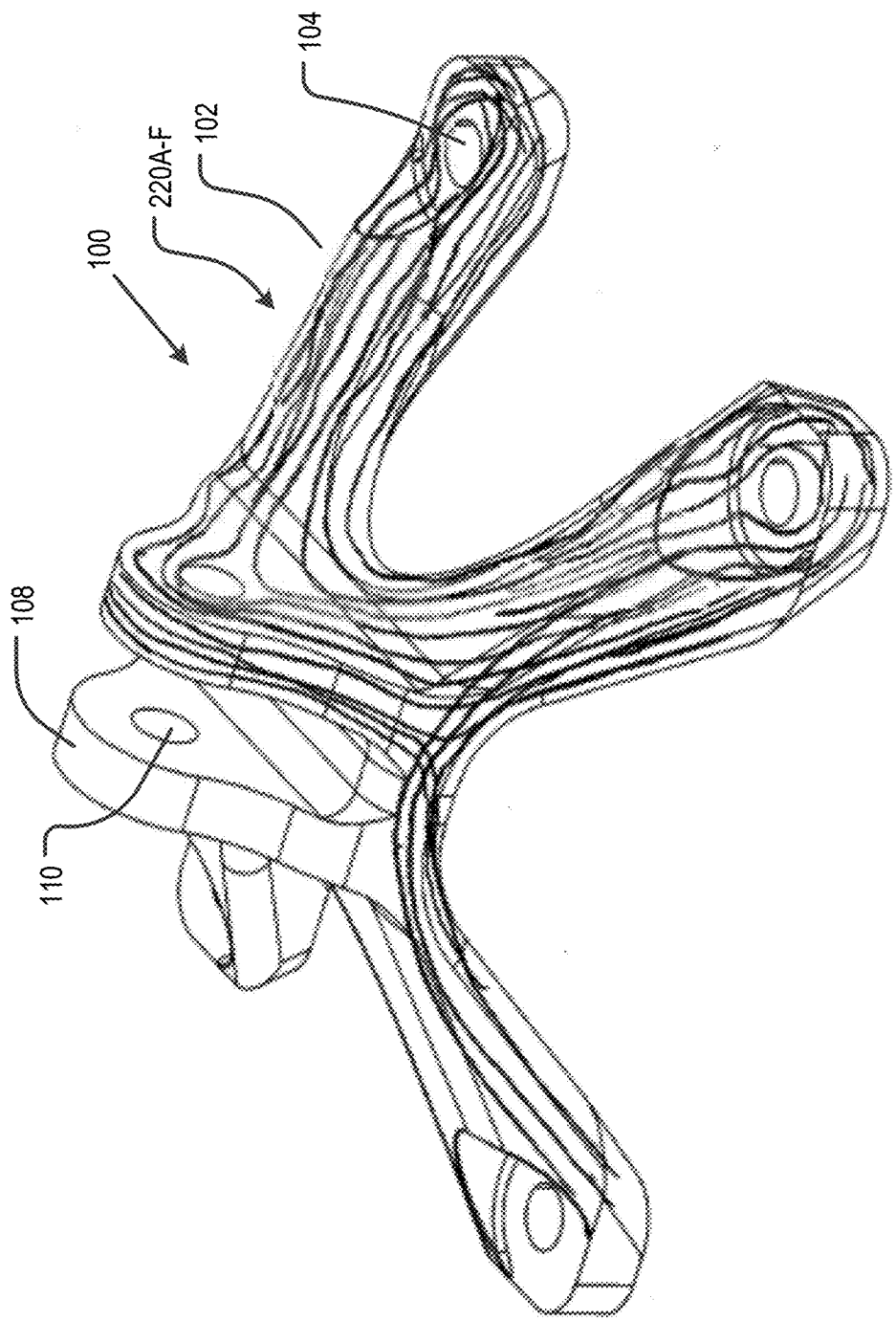
FIG. 2B depicts the presence of additional fibers consistent with the strategy shown in FIG. 2A.

FIG. 2B depicts the presence of additional preforms 220A through 220F, consistent with the strategy shown in FIG. 2A and described above. The preforms that are shown are but a small sample of those used to mold bracket 100. There are many other preforms (not shown for clarity), some of which will have different shapes than those depicted, to form all of the various features of the bracket. For example, preforms having relatively short straight lengths can be used to flow around the mounting holes per the teachings of Publ. Pat. App. US2020/0016846, incorporated by reference herein.

FIG. 3A depicts an exploded view of multi-part mold 300. The multi-part mold includes mold base 330, primary core 340, secondary core 350, pins 336, and pin 338. The parts of mold 300 are typically made from metal, such as aluminum, carbon steel, and/or tool steel such as P20 or H13.

Mold base 330 includes mold cavity 332. The mold cavity receives plural preforms or preform charge(s), which, after compression and heat, defines at least a portion of the part being formed. In this embodiment, cavity 332 defines the shape of bracket 100 (i.e., orientation of prongs 102, etc.), with the exception of tabs 108 of clevis 106. Mold base 330 also includes vent holes 334. The vent holes are situated at particular locations to promote fiber flow and consolidation in areas of cavity 332 that are relatively harder to fill. Four pins 336 are inserted into mold base 330 and are used to form holes 104, such as for mounting the bracket 100 to a surface.

Primary core 340 is one of the (mostly) male portions of multi-part mold 300. The primary core includes members 342, which are appropriately sized and shaped to define the contours of the upper surface of prongs 102 when primary core 340 is forced against mold base 330 and the material in cavity 332 is compressed therebetween.

The upper surface of primary core 340 includes two oblong slots 344. In conjunction with features of secondary core 350, slots 344 facilitate forming tabs 108 of clevis 106. Holes 348 receive pins 336, helping to stabilize and maintain alignment of primary core 340 with respect to mold base 330. Receiver 346 accepts cross pin 338; this pin is responsible for forming (clevis) holes 110 in bracket 100. Additional holes in the upper surface of primary core 340 facilitate its removal from mold base 330 after the molding cycle is complete.

Secondary core 350 includes members 352. These members, which are received by oblong openings 344 in primary core 340 when the mold is assembled, are appropriately sized and shaped to define tabs 108 of clevis 106. Holes 354, like holes 348 (of primary core 340), receive pins 336, helping to stabilize and maintain alignment of secondary core 350 and primary core 340 with respect to mold base 330. Additional holes in the upper surface of secondary core 350 facilitate its removal from primary core 340 after the molding cycle is complete.

FIG. 3B depicts multi-part mold 300 with pins 336 inserted into mold base 330 and cross pin 338 inserted into receiver 346 of primary core 340.

Figure 4B:
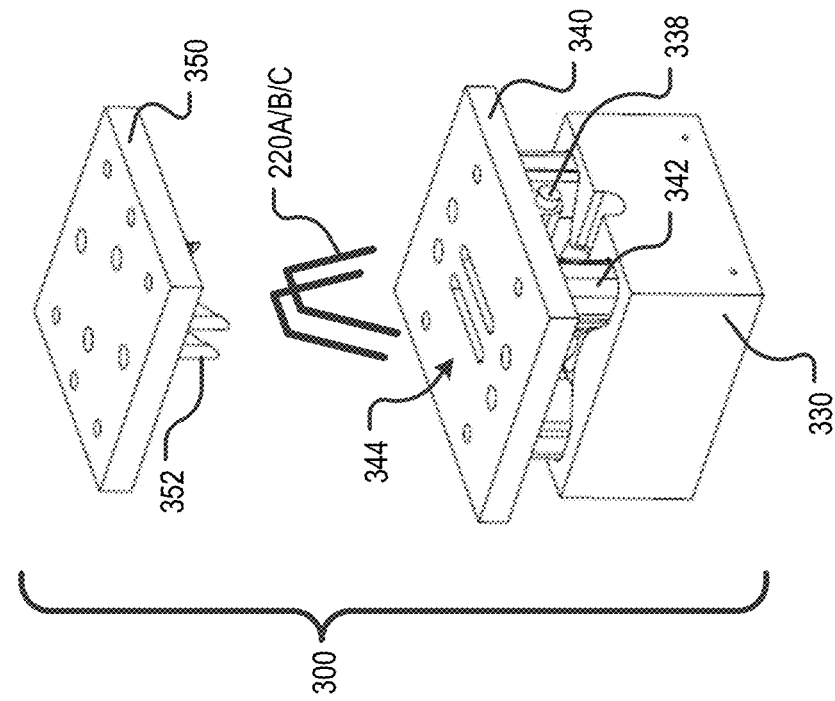
FIG. 4B depicts the multi-part mold of FIG. 4A with a primary core inserted in the mold cavity and a second group of exemplary preforms for use in forming the tabs of the clevis.
Figure 4A:
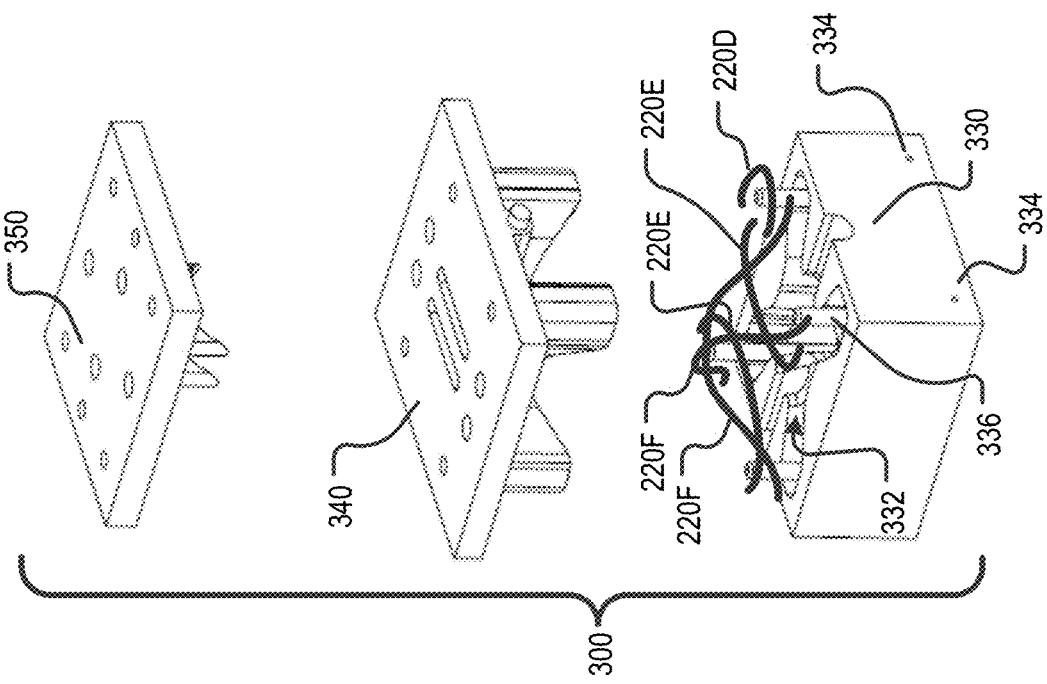
FIG. 4A depicts the multi-part mold of FIG. 3B with a first group of exemplary preforms for use in selected regions of the mold.

FIG. 4A depicts multi-part mold 300 with examples of some of the preforms used to establish the predetermined desired fiber alignment for molding bracket 100, based on the location of the anticipated principle stress vectors. Individual preforms are shown for clarity, it being understood that many more of each such preforms, as well as other preforms having different shapes, either individually or as combined into one or more preform charges, are used to form bracket 100.

Depicted in FIG. 4A are preforms 220F, which are sized and shaped to extend between diagonally situated prongs 104 of bracket 100. Also depicted are preforms 220E, which are sized and shaped to extend between adjacent prongs of the bracket. Finally, preform 220D is shown, which is sized and shape to wrap around pins 336 (which will form holes 104) and extend into the associated prong. Vents 334 are positioned to promote fiber flow around pins 336 (i.e., ultimately, mounting holes 104).

FIG. 4B depicts multi-part mold 300 partially assembled. All "prong" preforms (e.g., preforms 220D, 220E, 220F, etc.) have been placed in mold cavity 332 and primary core 340 has been placed thereon. Note that members 342 of primary core 340 do not fully seat in cavity 332. This is because consolidation and molding has not yet occurred, and the various preforms within the cavity, as a consequence of crossing over other preforms, etc., take up significantly more vertical space than they will after molding is complete.

In FIG. 4B, the preforms responsible for forming clevis 106—preforms 220A, 220B, and 220C—are depicted above primary core 340. They are to be placed in slots 344. A sufficient amount of such preforms are used to completely fill the volume in tabs 108 above cross pin 338 to enhance the strength of bracket 100 around clevis holes 110. It is also particularly important that clevis-forming preforms 220A, 220B, and 220C are long enough to extend past tabs 108 and as far as possible into prongs 104 to provide as much strength as possible in the high-stress area where the tabs join the prongs. To facilitate extending the clevis-forming preforms 220A, 220B, and 220C far into the prong-forming preforms 220D, 220E, 220F, it can be beneficial to place clevis-forming preforms 220A, 220B, and 220C into slots 344 in primary core 340 before placing primary core 340 on mold base 330.

In the absence of secondary core 350, it would not be possible to have fibers extending continuously from one prong 104, up and over (clevis pin) hole 110, and back down into another prong 104. These long, continuous fibers are what gives bracket 100 exceptional strength and stiffness.

FIG. 4C depicts mold 300 fully assembled and filled with preforms. Members 352 (not depicted in FIG. 4C) of secondary core 350 do not full seat within primary core 340 because, as discussed with respect to the primary core seating in the mold base 330, the preforms take up more space in the mold prior to consolidation and molding. The total volume of preforms is equal to or slightly greater than the total volume of the final part. During molding, excess material will escape through vents (e.g., vents 334) or as flash.

Sufficient excess height is provided in cavity 332 of mold base 330 and slots 344 of primary core 340 to accommodate the preforms. In embodiments in which such excess height is not available, the molding operation can be performed in multiple steps. That is, the preforms are partially consolidated (via pressure) in a first step, and then more preforms are added between press cycles.

After assembly, mold 300 is placed in a compression press, and a molding cycle—comprising a sequence of heat and pressure—is performed. The heat and pressure cause the resin in the preforms to flow. The part consolidates as the primary and secondary cores close. It is notable that during this process, both primary core 340 and secondary core 350 compress the preplaced preforms, and are involved in shaping the part being produced. This is in contrast, for example, to other molding process wherein a plunger is used to force fibers into a closed cavity to produce composite parts, but play no role in shaping the part.

FIG. 4D depicts mold 300 completely closed after the molding cycle. After cooling, the molded part (i.e., bracket 100) is completely consolidated within the multi-part mold. By virtue of the present invention, the bracket comprises long, continuous fibers connecting all features in a predetermined orientation to provide nearly-optimal stiffness and strength.

In a final step, the part is removed from the mold. This is a simple process that includes separating the various mold components (i.e., mold base 330, primary core 340, and secondary core 350) and removing pins 336 and pin 338.

In some embodiments, cores (e.g., primary 340, secondary 350, etc.) are used at different stages of the molding process, and do not have to be compressed simultaneously. For example, in some embodiments, a primary core, such as primary core 340, is fully closed before a secondary core, such as secondary core 350. In some other embodiments, a multi-part mold having more three or more cores (i.e., primary, secondary, tertiary, etc.) are closed at different times during the molding process. By staging the closing times, the amount of overlap and entanglement between neighboring regions of a part can be limited.

For example, if a left-side core is fully closed before a right-side core, a preform charge inserted in the right-side core will not have much overlap/interaction with a preform charge from the left-side core. As a result, two distinct "areas" of the part are created. This approach can, for instance, be used to create an electrically transmissive area and an electrically insulating area in a single part, such as by using two different fiber types (e.g., carbon and glass, etc.). To minimize the overlap regions between, for example, carbon and glass fibers, staged timing of the cores is used.

It will be understood that bracket 100 is one of many relatively complex parts that can be made using a multi-part mold and fiber-bundle-based preforms and preform charges in accordance with the present teachings. In other embodiments, for example, other complex parts can be made using a differently configured three-part molds. Moreover, fiber-composite parts that include further complexity, such as parts having more than two groups of holes, or groups of holes that fall along more than two out-of-plane axes, can be molded in accordance with the present teachings by using additional mold elements. Thus, in some other embodiments of the invention, relatively more complex parts than bracket 100 are made via a four-part mold (n=4), a five-part mold (n=5), etc. Or, one or more additional mold elements are used to create other features, particularly those that require placing long, continuous fibers in regions that would be otherwise difficult to access. Moreover, although the illustrative embodiment depicts a multi-part mold that closes in a single direction, in other embodiments, the mold can include additional parts that close in multiple different directions.

Figure 6:
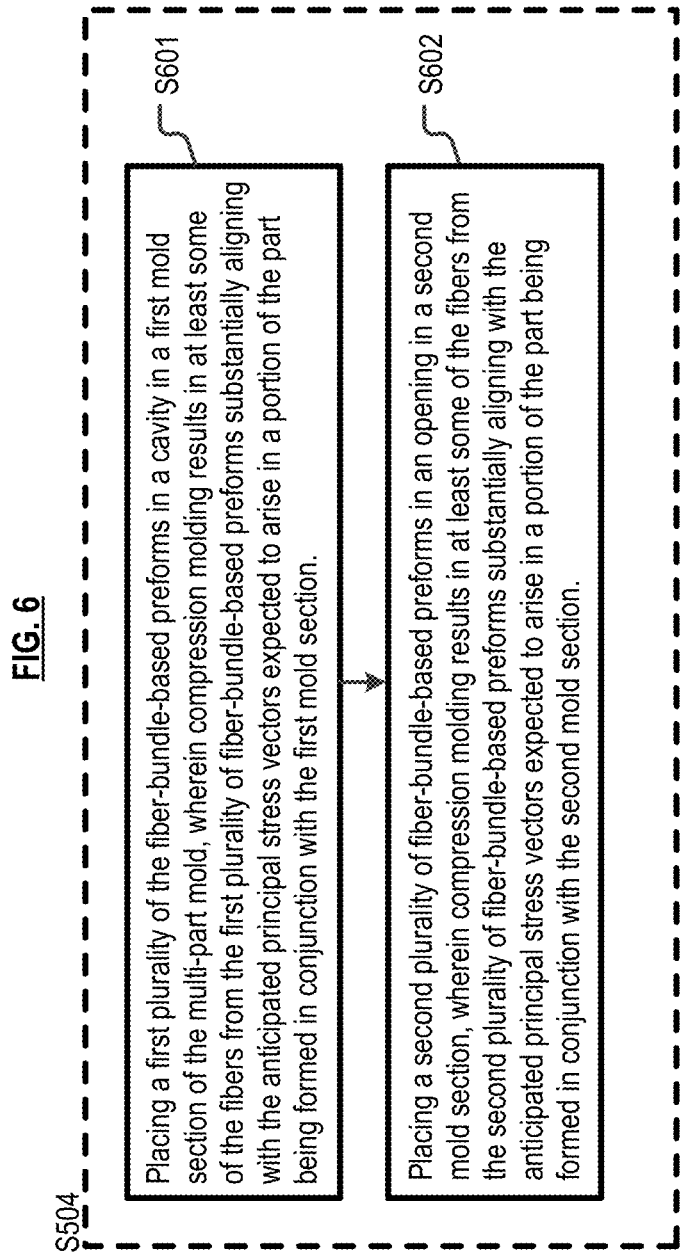
FIG. 6 depicts suboperations of operation S504 of the method of FIG. 5.
Figure 7:
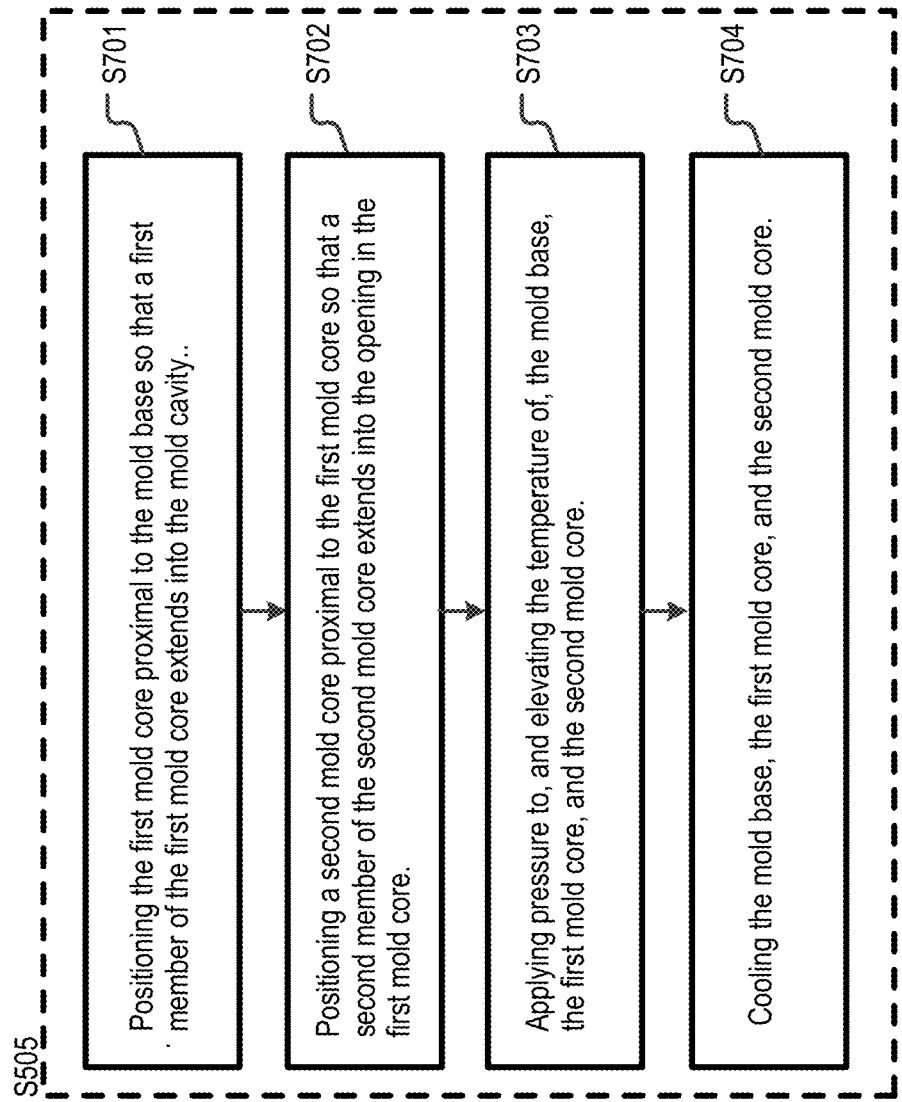
FIG. 7 depicts suboperations of operation S505 of the method of FIG. 5.

FIGS. 5-7 depict flow charts of methods in accordance with the present invention for forming a complex part.

FIG. 5 depicts methods 500A and 500B for forming a complex part via compression molding, in accordance with an illustrative embodiment of the present invention. Method 500A is directed to the development of preform layout for achieving a desired fiber alignment in a complex part, and a multi-part mold capable of molding the complex part. Method 500B is directed to molding the complex part via the preform arrangement and multi-part mold developed via method 500A.

In accordance with operation S501, the anticipated principle stress vectors for the complex part being fabricated are determined/estimated. Such stresses arise during use under the anticipated loads. In operation S502, an arrangement of fiber-bundle-based preforms is developed that, when placed in a suitable multi-part mold, and as a consequence of conducting a compression molding process, results in the desired fiber alignment wherein fibers from the preforms substantially align with the anticipated principle stress vectors determined in operation S501.

The anticipated principle stress vectors can be determined (operation S501), for example, using the techniques disclosed in Pub. Pat. App. US2020/00130297, incorporated by reference herein. Briefly, that application discloses: (a) developing a description of the part's geometry, (b) developing a description of the part's anticipated loading conditions, and (c) performing a finite element analysis (FEA) on the part geometry to calculate the stress under load. This results in a three-dimensional principal stress contour map for the interior of the component. Additionally, and with reference to operation S502 of method 500, the referenced publication discloses that by considering the orthotropic material properties at hand, a preform "map" (i.e., a preform layout) can be developed from the principal stress contour map, such as by using a technique that determines "low-cost" routing. See also, U.S. patent application Ser. No. 16/811,537.

Operation S503 of method 500 recites configuring plural mold sections so that, in conjunction with the preforms, subjecting the plural mold sections and preforms to the compression molding process results in the complex part having the desired fiber alignment. Performing this operation will be iterative, to some extent, with operation 502. That is, in addition to designing a multi-part compression mold that is capable of making the part, it must also be suitable for establishing the desired fiber alignment. In view of any number of physical constraints, it is unlikely that an "optimal" fiber alignment determined via FEA, as discussed above, can be realized. The method disclosed in Pub. Pat. App. US2020/00130297 acknowledges and compensates for such physical limitations by modifying the idealized output from FEA analysis to provide a "process-compensated" preform map, via an iterative approach. Similarly, the development of a multi-part mold that is capable of actualizing the desired fiber alignment will often be an iterative process, balancing "optimal" fiber alignment with "realizable" fiber alignment.

As an alternative to the approach discussed above for performing operations S501 and S502, for some complex parts, those skilled in the art will be able to at least estimate the anticipated principle stress vectors without rigorous analysis. Moreover, in view of the present disclosure and without rigorous analysis, those skilled in the art will be able to develop an arrangement of preforms capable of establishing a fiber alignment consistent with the anticipated principle stress vectors. However, the development of multi-part compression mold suitable for actualizing the desired fiber alignment is likely to require some iteration of operations S502 and S503.

Having developed an arrangement of preforms suitable for achieving the desired fiber alignment (i.e., aligning fibers with the anticipated principle stress vectors), a complex part can be molded, in accordance with method 500B.

In accordance with operation S504 of method 500B, preforms are positioned in the multi-part compression mold consistent with the arrangement developed in method 500A. It was previously disclosed that in some embodiments, as appropriate, the closing times of various sections of a multi-part mold are staged, for various purposes. Furthermore, the addition of preforms to the various mold sections can be staged as well. Thus, not all of feed constituents are necessarily added to the multi-part mold at the same time. After the preforms are added to the multi-part mold, the part is molded in operation S505.

FIG. 6 depicts, for some embodiments, further detail of operation S504. In particular, in operation S601, a first plurality of the fiber-bundle-based preforms are placed in a cavity in a first mold section of the multi-part mold, wherein compression molding results in at least some of the fibers from the first plurality of fiber-bundle-based preforms substantially aligning with the anticipated principal stress vectors expected to arise in a portion of the part being formed in conjunction with the first mold section. In operation S602, a second plurality of fiber-bundle-based preforms are placed in an opening in a second mold section, wherein compression molding results in at least some of the fibers from the second plurality of fiber-bundle-based preforms substantially aligning with the anticipated principal stress vectors expected to arise in a portion of the part being formed in conjunction with the second mold section.

In complex parts, as defined herein, there are likely to be a number of principal stress vectors arising in the part due to the forces imparted to the part during operation. The multi-part molds disclosed herein are capable of forming parts in which fibers sourced from fiber-bundle-based preforms are substantially aligned with the multiple principle stress vectors that arise in the part during use.

FIG. 7 depicts, for some embodiments, further detail of operation S505 (molding the part). In particular, operation S701 recites positioning the first mold core proximal to the mold base so that a first member of the first mold core extends into the mold cavity. This is shown, for example, in FIG. 4B, wherein members 342 of first mold core 340 extend into mold cavity 332 of mold base 330.

Operation S702 recites positioning a second mold core proximal to the first mold core so that a second member of the second mold core extends into the opening in the first mold core. This is depicted in FIG. 4C, wherein members 352 (not depicted in FIG. 4C; see FIG. 4A) extend into openings 344 in first mold core 340.

In operation S703, in accordance with compression molding temperature and pressure protocols, pressure is applied to the mold constituents in the various mold sections and the temperature of the mold sections is raised. Pressure is usually in the range of about 100 psi to about 300 psi, and temperature, which is a function of the particular resin being used, is typically in the range of about 150° C. to about 400° C. Elevated pressure and temperature are typically maintained for a few minutes. In operation S704, the multi-part mold is removed from the source of pressure and the mold sections are cooled. Once cooled, the mold sections are removed and the finished part is obtained.

It is to be understood that the disclosure describes a few embodiments and that many variations of the invention can easily be devised by those skilled in the art after reading this disclosure and that the scope of the present invention is to be determined by the following claims.

What is claimed is:
1. A multi-part compression mold for molding a complex fiber-composite part, the multi-part compression mold comprising:
 a first mold section having a cavity therein, the first mold section including a plurality of first holes, each extending to the cavity;
 a second mold section having a first side and a second side, wherein a first member extends from the first side of the second mold section, wherein the first member is physically adapted to be received by the cavity, and wherein the first member and the cavity are dimensioned and arranged to form a base of the complex part, and further wherein the second mold section has a first opening;
 a third mold section having a first side and a second side, wherein a second member extends from the first side of the third mold section and is physically adapted to be received by the first opening in the second mold section, and wherein the second member and the first opening are dimensioned and arranged to form a first tab of the complex part, wherein the first tab extends out-of-plane with respect to the base, wherein in use during compression molding, the first, second and third mold sections are sequentially positioned and appropriately aligned such that the first mold section receives the first member of the second mold section and the second mold section receives the second member of the third mold section;
 a plurality of first pins, wherein the first pins are received by the plurality of first holes in the first mold section and extend into the cavity during compression molding to form a plurality of holes in the base; and
 a second pin, wherein the second pin is received by the second mold section to form a hole in the first tab.

2. The multi-part compression mold of claim 1 wherein a through-axis of each hole in the base and the through-axis of the hole in the tab are orthogonal with respect to one another.

3. The multi-part compression mold of claim 1 wherein the plurality of first pins is received by the first mold section, the second mold section, and the third mold section, and functions to align the sections to one another, in addition to forming the plurality of holes in the base.

4. The multi-part compression mold of claim 1 wherein the first member, the cavity, and the plurality of first holes are dimensioned and arranged so that in the complex part formed therefrom, the base comprises four prongs extending from a central region, each prong including one of the holes in the base.

5. The multi-part compression mold of claim 1 wherein:
 (a) the second mold section has a second opening therethrough, wherein the second opening is spaced apart from the first opening;
 (b) a third member that is spaced apart from the second member extends from the first side of the third mold section;
 (c) wherein the third member and the second opening are dimensioned and arranged to form a second tab of the complex part, wherein the second tab is spaced apart from the first tab and extends out-of-plane with respect to the base; and (d) the second pin forms a hole in the second tab of the complex part.

6. The multi-part compression mold of claim 5 wherein:
(a) the first member, the cavity, and the plurality of first holes are dimensioned and arranged so that in the complex part formed therefrom, the base comprises four prongs extending from a central region, each prong including one of the holes in the base;
(b) the second and third opening in the second mold section, and the second and third member of the third mold section, are dimensioned and arranged so that, in the complex part formed therefrom, the two tabs depend from the central region of the base, and extend orthogonally away therefrom.

7. A method for forming a complex part having a desired fiber alignment using a multi-part compression mold, the method comprising:
forming a base of the complex part, comprising:
(a) placing a first plurality of fiber-bundle-based preforms, organized in a first arrangement, in a cavity of a first mold section of the multi-part mold, the plurality of fiber-bundle-based preforms in the first arrangement being positioned to substantially align with principal stress vectors expected to arise in the base of the complex part when in use;
(b) inserting a plurality of first pins through the cavity;
closing the cavity using a second mold section and compression molding the first arrangement, thereby forming the base of the complex part, wherein the base comprises a plurality of holes resulting from the presence of the first pins in the cavity; and
forming a clevis portion of the complex part, the clevis portion having at least a first member extending away from the base, wherein forming the clevis portion comprises:
(a) placing a second plurality of fiber-bundle-based preforms in at least a first opening of the second mold section of the multi-part mold, the second plurality of fiber-bundle-based preforms being arranged to substantially align with principal stress vectors expected to arise in the clevis portion of the complex part when in use;
(b) inserting a second pin below the first opening in the second mold section;
(c) compression molding the second plurality of fiber-bundle-based preforms, thereby forming the clevis portion of the complex part, wherein the first member of the clevis portion comprises a hole resulting from the presence of the second pin during compression molding, and wherein compression molding of the first plurality of fiber-bundle-based preforms and the second plurality of fiber-bundle-based preforms is conducted using both the first mold section and the second mold section.

8. The method of claim 7 comprising compression molding the first plurality of fiber-bundle-based preforms before the second plurality of fiber-bundle based preforms.

9. The method of claim 7 wherein a through-axis of the hole in the clevis portion is substantially perpendicular to a through-axis of each of the holes in the base.

10. The method of claim 7 comprising compression molding the first plurality of fiber-bundle-based preforms and the second plurality of fiber-bundle based preforms at the same time.

11. The method of claim 7 wherein the second mold section includes a second opening proximal to the first opening, and wherein the method comprises placing some of the second plurality of fiber-bundle-based preforms in the second opening, wherein the clevis portion formed from compression molding the second plurality of fiber-bundle-based preforms includes the first member and a second member extending away from the base, each of the two members having a hole therethrough resulting from the presence of the second pin during compression molding.

12. The method of claim 11 wherein compression molding the second plurality of fiber-bundle-based preforms comprises inserting, into the at least first opening in the second mold section, at least a first member that extends from a third mold section, the multi-part compression mold thus having the first mold section, the second mold section, and the third mold section.

13. A method for forming a part having a desired fiber alignment using a multi-part compression mold, the complex part having a base and a clevis, the method comprising:
placing a first plurality of fiber-bundle-based preforms in a cavity of a first mold section of the multi-part mold, the cavity having a shape that defines four prongs;
placing a plurality of first pins in the cavity;
wherein the first plurality of preforms are placed in a first arrangement that, as a consequence of conducting a compression molding process using the multi-part mold, results in the desired fiber alignment for a base of the complex part, the base comprising four prongs consistent with the shape of the cavity, each prong having a hole formed from respective ones of the first pins;
placing a second plurality of fiber-bundle-based preforms in a first opening of a second mold section of the multi-part mold; and
placing a second pin below the first opening in the second mold section, wherein the second plurality of preforms are placed in a second arrangement that, as a consequence of conducting a compression molding process using the multi-part mold, results in the desired fiber alignment for the clevis of the complex part, the clevis having a hole formed from the second pin.

* * * * *